(12) United States Patent
Aoyama et al.

(10) Patent No.: US 6,858,069 B2
(45) Date of Patent: Feb. 22, 2005

(54) BLACK AQUEOUS INK COMPOSITION, INK JET RECORDING PROCESS USING THE SAME, AND RECORDED MATTER

(75) Inventors: Tetsuya Aoyama, Nagano (JP); Kazuhiko Kitamura, Nagano (JP); Hiroshi Fukumoto, Nagano (JP); Yoshihiro Sawatari, Osaka (JP); Shuji Sugawara, Osaka (JP); Makiko Matsui, Osaka (JP)

(73) Assignees: Seiko Epson Corporation, Tokyo (JP); Orient Chemical Industries, Osaka (JP)

(*) Notice: Subject to any disclaimer, the term of this patent is extended or adjusted under 35 U.S.C. 154(b) by 0 days.

(21) Appl. No.: 10/279,740

(22) Filed: Oct. 24, 2002

(65) Prior Publication Data

US 2004/0040466 A1 Mar. 4, 2004

(30) Foreign Application Priority Data

Oct. 26, 2001 (JP) .................................. P.2001-329837
Aug. 30, 2002 (JP) .................................. P.2002-254386
Oct. 24, 2002 (JP) .................................. P.2002-309471

(51) Int. Cl.$^7$ ............................. C09D 11/02; B41J 2/01
(52) U.S. Cl. ............................ 106/31.52; 106/31.49; 106/31.58; 106/31.59; 347/100
(58) Field of Search ..................... 106/31.52, 31.49, 106/31.58, 31.59; 347/100; 534/809, 810, 663, 667

(56) References Cited

U.S. PATENT DOCUMENTS

| | | | | | |
|---|---|---|---|---|---|
| 5,423,906 | A | * | 6/1995 | Gregory et al. | 106/31.48 |
| 5,536,819 | A | * | 7/1996 | Tamura et al. | 106/31.52 |
| 5,616,174 | A | * | 4/1997 | Kanaya et al. | 106/31.48 |
| 6,231,652 | B1 | * | 5/2001 | Koyano et al. | 106/31.27 |
| 6,451,989 | B1 | * | 9/2002 | Beach et al. | 534/728 |
| 6,632,932 | B1 | * | 10/2003 | Sawatari et al. | 534/810 |
| 2001/0027734 | A1 | * | 10/2001 | Geisenberger et al. | 106/31.52 |

FOREIGN PATENT DOCUMENTS

| | | |
|---|---|---|
| JP | 3-91576 | 4/1991 |
| JP | 3-229770 | 10/1991 |

* cited by examiner

*Primary Examiner*—Helene Klemanski
(74) *Attorney, Agent, or Firm*—Ladas & Parry LLP

(57) ABSTRACT

To provide a black aqueous ink composition for excellent light and gas fastness, an ink set including the ink composition, and an ink jet recording process using the same, the black aqueous ink composition contains at least a trisazo dye represented by Chemical Formula 31.

25 Claims, No Drawings

BLACK AQUEOUS INK COMPOSITION, INK JET RECORDING PROCESS USING THE SAME, AND RECORDED MATTER

DETAILED DESCRIPTION OF THE INVENTION

1. Technical Field to Which the Invention Belongs

The present invention relates to a black aqueous ink composition suitable for use in ink jet recording, an ink jet recording process using the same, and recorded matter obtained through recording by the recording process.

2. Background Art

Ink jet recording is a process in which an ink is ejected as small droplets from a minute nozzle to record characters or images on a surface of a recording medium. Techniques of ink jet recording which have been put to practical use include: a method comprising converting electrical signals. to mechanical signals with an electrostrictive element and intermittently ejecting an ink stored in a nozzle head to record characters or images on a surface of a recording medium; and a method comprising bubbling an ink stored in a nozzle head by rapidly heating that part of the ink which is located very close to the orifice and intermittently ejecting the ink based on the volume expansion caused by the bubbling to thereby record characters or images on a surface of a recording medium.

The inks for ink jet recording are generally ones prepared by dissolving various dyes in water or an organic solvent or in a mixture thereof, from the standpoints of safety and printing properties. However, the ink jet recording inks are required to satisfy severer requirements concerning various properties than inks for writing utensils such as fountain pens and ball-point pens.

In particular, ink jet printers have recently come to be employed for producing printed matters for advertisement. However, since printed matters produced with aqueous ink compositions such as those shown above are put up not only indoors but also outdoors, they are exposed to various lights including sunlight and to the air (which may contain ozone, nitrogen oxides, sulfur oxides, etc.). There is hence a phenomenon in which they deteriorate in image quality. Deterioration in black parts is especially significant.

For the purpose of improving gas fastness (especially ozone fastness) of ink compositions containing dyes as colorants, the disazo dye having the following structure has, for example, been proposed. See, for example, Patent Document 1 and Chemical Formula 7 identified below.

The disazo dye having the following structure has also been proposed. See, for example, Patent Document 2 and Chemical Formula 8 identified below. However, those ink compositions each have a drawback that the light fastness and gas fastness thereof are insufficient.

Patent Document 1 herein is Japanese Patent Laid-Open No. 229770/1991 and Patent Document 2, is Japanese Patent Laid-Open No. 91576/1991.

Problems that the Invention is to Solve

The present invention has been achieved in view of the circumstances described above, and an object thereof is to provide a black aqueous ink composition capable of giving printed matters which are excellent in light fastness and gas fastness and retain high image quality, preferably a black aqueous ink composition capable of giving printed matters which are excellent in light fastness, gas fastness, and storage stability and retain high image quality. Another object of the invention is to provide an ink jet recording process using the ink composition. A still other object of the invention is to provide recorded matter obtained through recording by the recording process.

Means for Solving the Problems

The present inventors made investigations on various known trisazo dyes and novel trisazo dyes with respect to their light fastness and gas fastness. As a result, they found that black dyes having the structure shown below have excellent light fastness and gas fastness and that these black dyes in which the counter ion (M) is an organic ammonium further have excellent storage stability. The invention was completed based on these findings.

1. The black aqueous ink composition has a feature of containing at least a trisazo dye represented by the following formula 1: Chemical Formula 9 (all Chemical Formulae are herein below) wherein A represents a hydrogen atom or a carboxyl group (—COOM); $R^1$, $R^2$, $R^3$, and $R^4$ each independently represent a hydrogen atom, an alkyl group having 1 to 5 carbon atoms, an alkoxy group having 1 to 5 carbon atoms, a hydroxyl group, a sulfamoyl group, a carbamoyl group, an acetyl group, a carboxyl group, a sulfo group, or a halogen atom; Nps represents a group selected from Chemical Formula 10 wherein M is selected from a hydrogen atom, an alkali metal, ammonium, and an organic ammonium and B represents a group selected from Chemical Formula 11 wherein M is selected from a hydrogen atom, an alkali metal, ammonium, and an organic ammonium.

2. The black aqueous ink composition of the invention has a feature that the trisazo dye is a trisazo dye represented by the following formula 2: Chemical Formula 12 wherein A represents a hydrogen atom or a carboxyl group (—COOM); $R^1$, $R^2$, $R^3$, and $R^4$ each independently represent a hydrogen atom, an alkyl group having 1 to 5 carbon atoms, an alkoxy group having 1 to 5 carbon atoms, a hydroxyl group, a sulfamoyl group, a carbamoyl group, an acetyl group, a carboxyl group, a sulfo group, or a halogen atom; and M is selected from a hydrogen atom, an alkali metal, ammonium, and an organic ammonium.

3. The black aqueous ink composition of the invention has a feature that the trisazo dye is a trisazo dye represented by the following formula 3: Chemical Formula 13 wherein A represents a hydrogen atom or a carboxyl group (—COOM); $R^1$, $R^2$, $R^3$, and $R^4$ each independently represent a hydrogen atom, an alkyl group having 1 to 5 carbon atoms, an alkoxy group having 1 to 5 carbon atoms, a hydroxyl group, a sulfamoyl group, a carbamoyl group, an acetyl group, a carboxyl group, a sulfo group, or a halogen atom; and M is selected from a hydrogen atom, an alkali metal, ammonium, and an organic ammonium.

4. The black aqueous ink composition of the invention has a feature that the trisazo dye is a trisazo dye represented by the following formula 4: Chemical Formula 14 wherein A represents a hydrogen atom or a carboxyl group (—COOM); $R^1$, $R^2$, $R^3$, and $R^4$ each independently represent a hydrogen atom, an alkyl group having 1 to 5 carbon atoms, an alkoxy group having 1 to 5 carbon atoms, a hydroxyl group, a sulfamoyl group, a carbamoyl group, an acetyl group, a carboxyl group, a sulfo group, or a halogen atom; and M is selected from a hydrogen atom, an alkali metal, ammonium, and an organic ammonium.

5. The black aqueous ink composition of the invention has a feature that the counter ion (M) in the trisazo dye represented by any of formulae 1 to 4 is an organic ammonium.

6. The black aqueous ink composition of the invention has a feature that the counter ion (M) in the trisazo dye represented by any of formulae 1 to 4 is an organic ammonium derived from a tertiary amine.

7. The black aqueous ink composition of the invention has a feature that the tertiary amine is N,N-dimethylethanolamine, triethanolamine, or triisopropanolamine.

8. The black aqueous ink composition of the invention has a feature that the trisazo dye is contained in an amount of from 0.1 to 12% by weight based on the whole amount of the ink composition.

9. The black aqueous ink composition of the invention has a feature of further containing a nitrogen-containing organic solvent.

10. The black aqueous ink composition of the invention has a feature that the nitrogen-containing organic solvent is 2-pyrrolidone.

11. The black aqueous ink composition of the invention has a feature of further containing a nonionic surfactant.

12. The black aqueous ink composition of the invention has a feature that the nonionic surfactant is an acetylene glycol type surfactant.

13. The black aqueous ink composition of the invention has a feature that the nonionic surfactant is contained in an amount of from 0.1 to 5% by weight based on the whole amount of the ink composition.

14. The black aqueous ink composition of the invention has a feature of further containing a penetrating agent.

15. The black aqueous ink composition of the invention has a feature that the penetrating agent is a glycol ether.

16. The black aqueous ink composition of the invention has a feature of having a pH as measured at 20° C. of from 7.5 to 10.5.

17. The black aqueous ink composition of the invention has a feature of further containing a yellow dye as a complementary color.

18. The black aqueous ink composition of the invention has a feature that the yellow dye is C.I. Direct Yellow 86, 132, or 173.

19. The black aqueous ink composition of the invention has a feature that it is for use in an ink jet recording process.

20. The black aqueous ink composition of the invention has a feature that the ink jet recording process is a recording process using an ink jet head which forms ink droplets by means of mechanical deformations of an electrostrictive element.

21. The ink jet recording process of the invention has a feature of comprising ejecting droplets of an ink composition and adhering the droplets to a recording medium to conduct recording, wherein any of the black aqueous ink compositions described above is used as the ink composition.

22. The recorded matter of the invention has a feature of being obtained through recording with any of the black aqueous ink compositions described above.

Mode for Carrying out the Invention

The ink composition of the invention comprises an aqueous medium comprising water or a combination of water and a water-soluble organic solvent and, contained in the aqueous medium, at least a dye represented by formula 1 given above. The composition may optionally contain a humectant, viscosity modifier, pH regulator, and other additives.

Preferred of the dyes represented by formula 1 which can be contained in the ink composition of the invention are dyes represented by formula 2 (Chemical Formula 4), formula 3 (Chemical Formula 5), or formula 4 (Chemical Formula 6). Preferred of the dyes represented by formula 2 are dyes represented by the following formula 5 (Chemical Formula 15). Preferred of the dyes represented by formula 1 (Chemical Formula 1), formula 2 (Chemical Formula 4), formula 3 (Chemical Formula 5), or formula 4 (Chemical Formula 6) are those in which M in the formula is an organic ammonium from the standpoint of the storage stability of the ink. See, Chemical Formula 15.

(For formula 5, M is selected from a hydrogen atom, an alkali metal, ammonium, and an organic ammonium.

The organic ammonium is represented by $(NR^5R^6R^7R^8)^+$, wherein $R^5$, $R^6$, $R^7$, and $R^8$ may be the same and each represent hydrogen (the organic ammonium in which all of $R^5$ to $R^8$ are hydrogen is excluded because it is ammonium), an optionally substituted alkyl group having 1 to 5 carbon atoms, an optionally substituted phenyl group, or an optionally substituted aralkyl group. Examples of these groups include 3-aminopropyl, 2-hydroxyethyl, n-butyl, tert-butyl, 2-cyanoethyl, benzyl,. isopropyl, carboxymethyl, phenyl, m-tolyl, p-tolyl, and 1-hydroxyisopropyl. The organic ammonium preferably is an organic ammonium obtainable from a tertiary amine. Examples of the tertiary amine include N-(3-aminopropyl)diethanolamine, N-n-butyldiethanolamine, N-tert-butyldiethanolamine, N-(2-cyanoethyl)diethanolamine, N,N-dibenzyl-2-aminoethanol, 2-di-n-butylaminoethanol, N,N-diethylethanolamine, N,N-dimethylethanolamine, N,N-diisopropylethanolamine, N-ethyldiethanolamine, N,N-bis(carboxymethyl) ethanolamine, N-methyldiethanolamine, N-phenyldiethanolamine, triethanolamine, m-tolyldiethanolamine, p-tolyldiethanolamine, N,N-bis(2-hydroxyethyl)isopropanolamine, N,N-dimethylisopropanolamine, 3-dimethylamino-1-propanol, triisopropanolamine, and N-phenyldiisopropanolamine. More preferred of those are the organic ammoniums obtained from N,N-dimethylethanolamine, triethanolamine, and triisopropanolamine. This is because these organic ammoniums not only impart ink storage stability but also enable the ink composition to be easily regulated in viscosity and not to deteriorate the inertness to the materials constituting various members with which the ink composition may come into contact.

Specific examples of the dye represented by formula 1 include those whose free acid forms are shown in the following Table 1-1 to Table 1-5 (provided that the dyes shown in Tables 1-1 to 1-3 and 1-5 are in the form of free acid, while in each of the dyes shown in Table 1-4, the M's are a mixture of a sodium ion and an organic ammonium). However, the dye represented by formula 1 should not, of course, be construed as being limited to these examples.

Those dyes represented by formula 1 may be used alone or in combination of two or more thereof.

A dye represented by formula 5 given above can be obtained, for example, by conducting coupling reactions (→) in the order of (1), (2), and (3) as shown below. See, Chemical Formula 16.

Namely, the target dye is obtained through: (1) a step in which diazotized anthranilic acid is caused to couple with g-acid; (2) a step in which the resultant monoazo compound is diazotized and this diazotization product is caused to couple with K-acid; and (3) a step in which diazotized anthranilic acid is caused to couple with the resultant disazo compound.

The trisazo dye represented by formula 1 given above has one or two structures each comprising two benzene nuclei separated by an azo bond. In this structure, one of the benzene nuclei has a carboxyl group in an ortho position (relative to the azo bond) and the other benzene nucleus has a hydroxyl or amino group in an ortho position and further has a sulfo group in the other ortho position. It is thought that due to this structure, the dye retains fastness to light and gases. A more illuminating explanation is given below on dyes shown below in Chemical Formula 17, which are represented by formula 5, as an example. Dyes having in their molecular structure two structures each surrounded by the dotted line (e.g., the dyes represented by Chemical Formula 21 to Chemical Formula 24, which will be given later) are superior to dyes having one structure surrounded by the dotted line (e.g., the dyes represented by Chemical Formula 25 and Chemical Formula 26, which will be given later). As can be presumed from this fact, dyes having two such structures (e.g., the dyes represented by Chemical Formula 21 to Chemical Formula 24, which will be given later) are preferred of the dyes represented by formula 1. See, Chemical Formula 17.

Namely, when dyes of the kind described above are used in an ink for ink jet recording, this ink shows a high color density in printed images and high fastness (fastness regarding light resistance, gas resistance, water resistance, and stability). Although the reasons for this effect have not been fully elucidated, the following is thought. These dyes have an azo-bond-containing structure comprising a combination of two aromatic rings in which one aromatic ring (anthranilic acid) has a carboxyl group in an ortho position to the azo bond group and the other aromatic ring is one which is part of the K-acid or g-acid. This configuration of functional groups is less apt to result in the formation of impurities in the synthesis by successive coupling reactions. Because of this, the dye has an exceedingly high purity and the synthesis does not yield oxides or the like which may be causative of a decrease in fastness.

The dye represented by formula 1 has satisfactory water resistance because it has a carboxyl group in the dye structure. Moreover, since the dye further has water-soluble acid groups such as sulfo groups, it dissolves in aqueous media in the form of an alkali metal salt or ammonium salt. In case where an acidic aqueous medium is used, the dye shows reduced solubility. It is therefore preferred to regulate the pH of the ink composition (20° C.) to 7.5 or higher for stably dissolving the dye in a given amount. When inertness to the materials constituting various members with which the ink composition may come into contact is taken into account, it is preferred to regulate the pH of the ink composition to 10.5 or lower. For more satisfactorily reconciling these requirements, it is more preferred to regulate the pH of the ink composition to 8.0 to 10.0.

The amount of the dye represented by formula 1 contained in the ink composition of the invention is from 0.1 to 12% by weight, more preferably from 0.5 to 10% by weight, most preferably from 1 to 8% by weight. In case where the content of the dye represented by formula 1 is lower than 0.1% by weight, there is a problem that coloring properties or a color density on a recording medium cannot be secured. In case where the content thereof exceeds 12% by weight, there is a problem that it is difficult to regulate the viscosity of the ink composition and properties such as ejection reliability and nonclogging properties cannot be secured.

The ink composition of the invention can contain a yellow dye as a complementary-color dye for the purpose of color regulation. The yellow dye may be any dye which is yellow. Examples thereof include C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165; C.I. Direct Yellow 1, 8, 11, 12, 24, 26, 27, 33, 39, 44, 50, 55, 85, 86, 87, 88, 89, 110, 132, 142, 144, and 173; C.I. Reactive Yellow 1, 2, 3, 4, 6, 7, 11, 12, 13, 14, 15, 16, 17, 18, 22, 23, 24, 25, 26, 27, 37, and 42; C.I. Food Yellow 3 and 4; and C.I. Solvent Yellow 15, 19, 21, 30, and 109. Preferred of these are C.I. Acid Yellow 23 and C.I. Direct Yellow 50, 55, 86, 132, and 173 because use of these yellow dyes facilitates the attainment of ink reliability such as coloring properties and nonclogging properties. Especially preferred are C.I. Direct Yellow 86, 132, and 173 from the standpoint of imparting satisfactory light resistance besides producing those effects.

The ink composition of the invention can further contain a humectant selected from water-soluble organic solvents having a lower vapor pressure than pure water and/or saccharides. When the ink contains a humectant, water evaporation can be inhibited to keep the ink moist in ink jet recording processes. When the humectant is a water-soluble organic solvent, it can improve ejection stability and facilitate viscosity regulation without changing ink properties. The water-soluble organic solvent means a medium having the ability to dissolve solutes therein, and is selected from water-soluble solvents which are organic and have a lower vapor pressure than water. Desirable examples of the organic solvents include polyhydric alcohols such as ethylene glycol, propylene glycol, butanediol, pentanediol, 2butene-1,4-diol, 2-methyl-2,4-pentanediol, glycerol, 1,2,6-hexanetriol, diethylene glycol, triethylene glycol, and dipropylene glycol; ketones such as acetonylacetone; esters such as g-butyrolactone and triethyl phosphate; and furfuryl alcohol, tetrahydrofurfuryl alcohol, and thiodiglycol. Preferred examples of the saccharides include maltitol, sorbitol, gluconic lactone, and maltose. A humectant may be added in an amount of generally from 5 to 50% by weight, preferably from 5 to 30% by weight, more preferably from 5 to 20% by weight, based on the whole amount of the ink composition. When the humectant amount is 5% by weight or larger, the ink can be kept moist. When the humectant amount is 50% by weight or smaller, the ink can be easily regulated so as to have a viscosity suitable for ink jet recording.

The ink composition of the invention preferably contains as a solvent a nitrogen-containing organic solvent. Examples of the nitrogen-containing organic solvent include 1,3-dimethyl-2-imidazolidinone, 2-pyrrolidone, N-methyl-2-pyrrolidone, e-caprolactam, and urea. Such nitrogen-containing solvents may be used alone or in combination of two or more thereof. The content of the solvent is preferably from 0.5 to 10% by weight, more preferably from 1 to 5% by weight. Contents thereof lower than 0.5% by weight pose a problem that the dissolution of the colorant according to the invention is improved little by the solvent addition. Contents thereof higher than 10% by weight pose a problem that the solvent impairs the inertness of the ink composition to the materials constituting various members with which the ink composition may come into contact.

The ink composition of the invention preferably contains a nonionic surfactant as an additive effective for obtaining rapid ink fixing (penetration) and simultaneously maintaining the roundness of each dot.

Examples of the nonionic surfactant for use in the invention include acetylene glycol type surfactants. Specific examples of the acetylene glycol type surfactants include Surfynol 465, Surfynol 104, and Olfin STG (trade names; all manufactured by Nisshin Chemical Industry Co., Ltd.). The amount of the nonionic surfactant to be added is generally from 0.05 to 3% by weight, preferably from 0.5 to 2% by weight. Amounts thereof smaller than 0.05% by weight are undesirable in that sufficient penetrating properties cannot be obtained. Amounts thereof exceeding 3% by weight are undesirable in that image fogging may occur, leading to a decrease in image quality.

Addition of a glycol ether as a penetrating agent in combination with the nonionic surfactant is effective in enhancing penetrating properties and reducing the bleeding which may occur at the interface between adjacent color inks in color printing. Thus, an exceedingly clear image can be obtained.

Examples of the glycol ether for use in the invention include ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether, and triethylene glycol monobutyl ether. The amount of the glycol ether to be added is generally from 3 to 30% by weight, preferably from 5 to 15% by weight. In case where the amount thereof is smaller than 3% by weight, the effect of preventing bleeding cannot be obtained. In case where the amount thereof exceeds 30% by weight, not only image fogging occurs but also oil separation occurs, making it necessary to use a dissolution aid for the glycol ether. The addition of a dissolution aid results in an increase in ink viscosity to raise ejection difficulties in ink jet heads.

Other additives may be added to the ink composition of the invention according to need. Examples thereof include pH regulators such as triethanolamine and alkali metal hydroxides, water-soluble polymers such as sodium alginate, water-soluble resins, fluorochemical surfactants, mildew-proofing agents, and rust preventives.

Examples of methods for preparing the ink composition of the invention include a method in which the ingredients are sufficiently mixed and dissolved and the resultant solution is filtered under pressure through a membrane filter having an opening diameter of 0.8 mm and then degassed with a vacuum pump to prepare the ink composition.

The recording process of the invention, which uses the ink composition described above, will be explained next. The ink composition of the invention can be advantageously used especially in the recording process of the invention, which comprises ejecting droplets of the ink composition through a minute opening and adhering the droplets to a recording medium to conduct recording. However, it is a matter of course that the ink composition of the invention is usable also in applications such as general writing utensils, recording instruments, and pen plotters.

Any of known techniques of ink jet recording can be used. In particular, excellent images can be recorded in a method in which oscillations of a piezoelectric element are used to eject droplets (recording method using an ink jet head which forms ink droplets by means of mechanical deformations of an electrostrictive element) and a method in which thermal energy is utilized.

EXAMPLES

The invention will be explained below in more detail by reference to Examples and Comparative Examples. Prior to these, examples of the preparation of trisazo dyes to be used in the Examples of the invention are shown.

The invention should not be construed as being limited by the following Examples.

Preparation of Trisazo Dye A

1) Synthesis of Monoazo Intermediate

Anthranilic acid (0.2 mol) was diazotized in an ordinary manner and caused to couple with g-acid (2-amino-8-naphthol-6-sulfonic acid; 0.2 mol). This reaction was conducted while regulating the pH of the reaction mixture to 10 to 11.5 by adding an aqueous sodium hydroxide solution. The resultant precipitate was taken out by filtration to obtain the following monoazo intermediate. See, Chemical Formula 18.

2) Synthesis of Disazo Intermediate

The monoazo intermediate (about 0.2 mol) obtained in 1) above was diazotized and caused to couple with K-acid (8-amino-1-naphthol-3,5-disulfonic acid; 0.19 mol). This reaction was conducted while regulating the pH of the reaction mixture to 3.5 or lower by adding an aqueous sodium carbonate solution. The resultant precipitate was taken out by filtration to obtain the following disazo intermediate. See, Chemical Formula 19.

3) Synthesis of Trisazo Compound

Subsequently, methyl anthranilate (0.18 mol) was diazotized in an ordinary manner and caused to couple with the disazo intermediate (about 0.19 mol) obtained in 2) above. This reaction was conducted while regulating the pH of the reaction mixture to 8 to 11 by adding an aqueous sodium hydroxide solution. Salting-out was conducted, and the resultant precipitate was taken out by filtration to obtain the following trisazo compound. See, Chemical Formula 20.

4) Synthesis of Trisazo Dye A ($M_1$ Salt of Compound Example 1)

The trisazo compound obtained in 3) above was dissolved in water. Sodium hydroxide was added thereto to hydrolyze the trisazo compound at 55 to 65° C. and thereby convert the methoxycarbonyl group (—$COOCH_3$) into a carboxyl group. The resultant reaction mixture was subjected to desalting purification, and ammonia water was then added thereto to adjust the pH of the mixture to 9 to 9.5. Thus, a trisazo dye A represented by the following formula ($M_1$ salt of compound example 1) was obtained. See, Chemical Formula 21. (In the formula, $M_1$'s each independently are Na or $NH_4$, the proportion of Na to $NH_4$ being about 3:2.)

Preparation of Trisazo Dyes B, C, and D

After the methoxycarbonyl group (—$COOCH_3$) was converted to a carboxyl group in step 4) in the preparation of trisazo dye A described above, concentrated hydrochloric acid was added to the reaction mixture to adjust the pH thereof to 1 to 2. The dye thus obtained was isolated by filtration. The resultant press cake of the dye was dissolved in water with the aid of each of N,N-dimethylethanolamine, triethanolamine, and triisopropanolamine and subjected to desalting purification with a reverse osmosis membrane. Thus, trisazo dyes B, C, and D (organic-ammonium salts) represented by the following formulae were obtained.

Trisazo Dye B (Compound Example 11), see Chemical Formula 22.

Trisazo Dye C (Compound Example 12), see Chemical Formula 23.

Trisazo Dye D (Compound Example 13), see Chemical Formula 24.

Preparation of Trisazo Dye E

The same procedure as in the preparation of trisazo dye A was conducted, except that p-phenedine was used in place of the anthranilic acid used in preparing the trisazo dye A. Thus, a trisazo dye E ($M_1$ salt of compound example 5) was obtained. See, Chemical Formula 25. (In the formula, $M_1$'s each independently are Na or $NH_4$, the proportion of Na to $NH_4$ being about 3:1.)

Preparation of Trisazo Dye F

The same procedure as in the preparation of trisazo dye A was conducted, except that p-n-butylaniline was used in place of the anthranilic acid used in preparing the trisazo dye A. Thus, a trisazo dye F ($M_1$ salt of compound example 9) was obtained. See, Chemical Formula 26. (In the formula, $M_1$'s each independently are Na or $NH_4$, the proportion of Na to $NH_4$ being about 3:1.)

Preparation of Trisazo Dye G

1) Monoazo Intermediate Synthesis (1). Methyl anthranilate (0.3 mol) was diazotized in an ordinary manner and caused to couple with K-acid (8-amino-1-naphthol-3,5-disulfonic acid). This reaction was conducted while regulating the pH of the reaction mixture to 1.5 or lower by adding an aqueous sodium carbonate solution. The reaction mixture was stirred overnight and then filtered to take out the precipitate. The press cake obtained was dissolved in water. Sodium hydroxide was added thereto to hydrolyze the reaction product at 55 to 60° C. and thereby convert the methoxycarbonyl group (—$COOCH_3$) into a carboxyl group. This reaction mixture was subjected to salting-out, and the resultant precipitate was taken out by filtration to obtain the following monoazo intermediate. See, Chemical Formula 27.

2) Monoazo Intermediate Synthesis (2). Anthranilic acid (0.3 mol) was diazotized in an ordinary manner and caused to couple with g-acid (2-amino-8-naphthol-6-sulfonic acid; 0.3 mol). This reaction was conducted while regulating the pH of the reaction mixture to 10 to 11.5 by adding an aqueous sodium hydroxide solution. The resultant precipitate was taken out by filtration to obtain the following monoazo intermediate. See, Chemical Formula 28.

3) Synthesis of Trisazo Compound. The monoazo intermediate (0.1 mol) obtained in 2) above was diazotized and caused to couple with the monoazo intermediate (0.1 mol) obtained in 1) above. This reaction was conducted while regulating the pH of the reaction mixture to 8 to 11 by adding an aqueous sodium hydroxide solution. Salting-out was conducted, and the resultant precipitate was taken out by filtration to obtain the following trisazo dye. See, Chemical Formula 29.

4) Preparation of Trisazo Dye G ($M_1$ Salt of Compound Example 14). The trisazo dye obtained in 3) above was dissolved in water. Concentrated hydrochloric acid was added thereto to adjust the pH thereof to 1 to 2 and this dye was isolated by filtration. The resultant press cake of the dye was dissolved in water with the aid of ammonia water and subjected to desalting purification. Thus, a trisazo dye G ($M_1$ salt of compound example 14) represented by the following formula was obtained. See, Chemical Formula 30. (In the formula, $M_1$'s each independently are Na or $NH_4$, the proportion of Na to $NH_4$ being about 3:1.)

Examples 1 to 7

Comparative Examples 1 and 2

Ink compositions of Examples 1 to 7 and Comparative Examples 1 and 2 were prepared according to the formulations shown in Table 3 by the preparation method described above. In the table, the amounts of the components of each ink composition are given in terms of % by weight based on the whole amount of the ink composition, and the remainder is water. The dyes used in the Comparative Examples are shown in Table 2.

The ink compositions described in Examples 1 to 7 and Comparative Examples 1 and 2 given above were subjected to the following evaluation tests. The results obtained are shown in Table 4. In the evaluation tests, ink jet printer PM-800C (manufactured by Seiko Epson Corp.) was used to conduct printing of alphabetic characters and graphic printing on PM Photographic Paper (trade name; manufactured by Seiko Epson Corp; Type No. KA420PSK) and PM Matte Paper (trade name; manufactured by Seiko Epson Corp.; Type No. KA450PM).

Light Fastness Test 1

Each of the ink compositions described in Examples 1 to 7 and Comparative Examples 1 and 2 was charged into an exclusive cartridge for black for ink jet printer PM800C (manufactured by Seiko Epson Corp.). Using this printer, printing was conducted on PM Photographic Paper and PM Matte Paper while regulating the duty so as to result in an OD (optical density) in the range of from 0.9 to 1.1. The printed matters thus obtained were allowed to stand for one day in an atmosphere having ordinary temperature and ordinary humidity and insulated from direct sunlight, and were then evaluated for light fastness under the following conditions. First, each printed matter was irradiated with light using xenon light fastness tester XL-75S (trade name; manufactured by Suga Test Instruments Co., Ltd.) under the conditions of a block panel, temperature of 40° C., relative humidity of 60%, radiation wavelength of from 300 to 400 nm, and irradiance of 36 W/m² (for 168 hours or 336 hours). The printed matter was examined with spectrophotometer GRETAG SPM (manufactured by Gretag Macbeth) before and after the light irradiation to determine the discoloration (DE) through the irradiation. Conditions for this color measurement were: illuminant D50; no illuminant filter; white standard was absolute white; and viewing angle of 2°. The discoloration was calculated according to the L*a*b* color system as provided for in JIS Z 8729.

$$\Delta E = \{(L^* - L_0^*)^2 + (a^* - a_0^*)2 + (b^* - b_0^*)^2\}^{0.5}$$

(L*, a*, b*: hue after irradiation
L₀*, a₀*, b₀*: hue before irradiation).

From the value of ΔE obtained, the light fastness was evaluated based on the following criteria.

A: ΔE is less than 10.
B: ΔE is from 10 to less than 20.
C: ΔE is from 20 to less than 30.
D: ΔE is 30 or more.

Gas Fastness Test

Each of the ink compositions described in Examples 1 to 7 and Comparative Examples 1 and 2 was charged into an exclusive cartridge for black for ink jet printer PM-800C (manufactured by Seiko Epson Corp.). Using this printer, printing was conducted on PM Photographic Paper while regulating the duty so as to result in an OD (optical density) in the range of from 0.9 to 1.1. The recorded matters thus obtained were allowed to stand for one day in an atmosphere having ordinary temperature and ordinary humidity and insulated from direct sunlight, and were then evaluated for gas fastness under the following conditions. First, each recorded matter was exposed to ozone with ozone weatherometer OMS Type H (trade name; manufactured by Suga Test Instruments Co., Ltd.) under the conditions of 24° C., relative humidity of 60%, and ozone concentration of 10 ppm for given periods (4 hours or 12 hours). The recorded matter was examined with spectrophotometer GRETAG SPM (manufactured by Gretag Macbeth) before and after the light irradiation to determine the discoloration (DE) through the irradiation. Conditions for this color measurement were: illuminant D50; no illuminant filter; white standard was absolute white; and viewing angle of 2°. The discoloration was calculated according to the L*a*b* color system as provided for in JIS Z 8729.

$$\Delta E = \{(L^* - L_0^*)^2 + (a^* - a_0^*)2 + (b^* - b_0^*)^2\}^{0.5}$$

(L*, a*, b*: hue after exposure
L₀*, a₀*, b₀*: hue before exposure).

From the value of ΔE obtained, the gas fastness was evaluated based on the following criteria.

A: ΔE is less than 10.
B: ΔE is from 10 to less than 20.
C: ΔE is from 20 to less than 30.
D: ΔE is 30 or more.

Storage Stability Test

Each of the ink compositions described in Examples 1 to 7 and Comparative Examples 1 and 2 was placed in an amount of 100 g in a heat-resistant glass container. These containers were tightly capped, subsequently stored in a 70° C. thermostatic chamber for 6 days, and then returned to ordinary temperature. These inks were filtered under reduced pressure through a membrane filter having an opening diameter of 0.8 mm and evaluated based on the following criteria.

A: no abnormality.
B: precipitate generated.

[Table 8](Table 4)

Advantage of the Invention

As described above in detail, since the black aqueous ink composition of the invention contains the trisazo dye represented by formula 1 as a colorant, the invention produces an excellent effect that the recorded matter obtained through printing with the ink composition has excellent light fastness and gas fastness and retains high image quality.

TABLE 1

Table 1-1

| Name | Structure | HPLC purity | λmax (abs.) |
|---|---|---|---|
| Compound example 1 | [chemical structure] | 96.3% | 603.2 nm (0.708) 512.4 nm (0.384) |

TABLE 1-continued

Table 1-1

| Name | Structure | HPLC purity | λmax (abs.) |
|---|---|---|---|
| Compound example 2 | | 97.6% | 608.0 nm (0.558) |
| Compound example 3 | | 95.2% | 601.0 nm (0.558) |
| Compound example 4 | | 65.2% | 605.2 nm (0.532) |

TABLE 2

Table 1-2

| Name | Structure | HPLC purity | λmax (abs.) |
|---|---|---|---|
| Compound example 5 | | 96.4% | 608.0 nm (0.596) |
| Compound example 6 | | 83.5% | 604.6 nm (0.464) |

TABLE 2-continued

Table 1-2

| Name | Structure | HPLC purity | λmax (abs.) |
|---|---|---|---|
| Compound example 7 | (structure) | 86.1% | 597.6 nm (0.529) |

TABLE 3

Table 1-3

| Name | Structure | HPLC purity | λmax (abs.) |
|---|---|---|---|
| Compound example 8 | (structure) | 84.5% | 608.4 nm (0.394) |
| Compound example 9 | (structure) | 92.9% | 604.2 nm (0.529) |
| Compound example 10 | (structure) | 84.4% | 597.6 nm (0.530) |

TABLE 4

Table 1-4

| Name | Structure | HPLC purity | λmax (abs.) |
|---|---|---|---|
| Compound example 11 | [structure with H = Na$^+$, NH$^+$(CH$_3$)$_2$(C$_2$H$_4$OH)] | | |
| Compound example 12 | [structure with H = Na$^+$, NH$^+$(C$_2$H$_4$OH)$_3$] | | 601.6 nm (0.577) 513.2 nm (0.320) |
| Compound example 13 | [structure with H = Na$^+$, NH$^+$[CH$_2$CH(CH$_3$)OH]$_3$] | | |

TABLE 5

Table 1-5

| Name | Structure | HPLC purity | λmax (abs.) |
|---|---|---|---|
| Compound example 14 | [structure] | 94.4% | 624.4 nm (0.623) |
| Compound example 15 | [structure] | 95.3% | 626.0 nm (0.615) |

TABLE 5-continued

Table 1-5

| Name | Structure | HPLC purity | λmax (abs.) |
|---|---|---|---|
| Compound example 16 |  | 92.7% | 621.2 nm (0.618) |

TABLE 6

Table 2

| Name | Structure |
|---|---|
| C.I. Direct Black 154 (C.I.D.B 154) | |
| C.I. Direct Black 168 (C.I.D.B 168) | |

TABLE 7

Table 3

| | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|
| Colorant Dye of Chemical Formula-21 | 6 | — | — | — | — | — | — | — | — |
| Dye of Chemical Formula-22 | — | — | — | 6 | — | — | — | — | — |
| Dye of Chemical Formula-23 | — | — | — | — | 6 | — | — | — | — |
| Dye of Chemical Formula-24 | — | — | — | — | — | 6 | — | — | — |
| Dye of Chemical Formula-25 | — | 6 | — | — | — | — | — | — | — |
| Dye of Chemical Formula-26 | — | — | 6 | — | — | — | — | — | — |
| Dye of Chemical Formula-30 | — | — | — | — | — | — | 6 | — | — |
| C.I. Direct Black 154 | — | — | — | — | — | — | — | 6 | — |
| C.I. Direct Black 168 | — | — | — | — | — | — | — | — | 6 |

TABLE 7-continued

Table 3

| | | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|---|
| Other ink components | Glycerol | 10 | 10 | 10 | 10 | 10 | 10 | 10 | 10 | 10 |
| | Diethylene glycol monobutyl ether | 10 | — | 10 | 10 | 10 | 10 | — | — | 10 |
| | Triethylene glycol monobutyl ether | — | 10 | — | — | — | — | 10 | 10 | — |
| | Triethylene glycol | — | 3 | 2 | 3 | 3 | 3 | — | 6 | 3 |
| | Urea | 2 | 1 | — | 1 | 1 | 1 | 4 | — | — |
| | 2-Pyrrolidone | 6 | 3 | 4 | — | — | — | 2 | — | — |
| | Triethanolamine | 0.6 | 0.6 | 0.6 | — | 0.6 | — | 0.6 | 0.6 | 0.6 |
| | Olfin STG (manufactured by Nisshin Chemical) | 0.4 | 0.4 | 0.4 | 0.4 | 0.4 | 0.4 | 0.4 | 0.4 | 0.4 |
| | Proxcel XL-2 (manufactured by AVECIA) | 0.3 | 0.3 | 0.3 | 0.3 | 0.3 | 0.3 | 0.3 | 0.3 | 0.3 |
| Water for preparation | Ultrapure water | remainder | remainder | remainder | remainder | remainder | remainder | remainder | remainder | remainder |

(Each numeral in the table is given in % by weight.)

TABLE 8

Table 4

| | Light resistance test | | | | Gas resistance test | | | | Ink storage stability 70° C., 6 days |
|---|---|---|---|---|---|---|---|---|---|
| | PM Photographic Paper 168 h | PM Photographic Paper 336 h | PM Matte Paper 168 h | PM Matte Paper 336 h | PM Photographic Paper 4 h | PM Photographic Paper 12 h | PM Matte Paper 4 h | PM Matte Paper 12 h | |
| Example 1 | A | A | A | B | A | B | A | B | |
| Example 2 | A | A | A | B | B | C | B | B | |
| Example 3 | A | B | B | C | A | B | A | B | |
| Example 4 | A | A | A | B | A | B | A | B | A |
| Example 5 | A | A | A | B | A | B | A | B | A |
| Example 6 | A | A | A | B | A | B | A | B | A |
| Example 7 | A | A | A | B | A | A | A | A | |
| Comparative Example 1 | D | D | D | D | C | D | B | C | A |
| Comparative Example 2 | B | D | B | C | D | D | B | C | A |

[Chemical Formula-1]

[Chemical Formula-2]

[Chemical Formula-9]

[Chemical Formula-10]

[Chemical Formula-31]

[Chemical Formula-32]

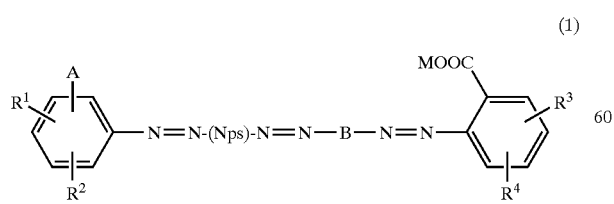

(1)

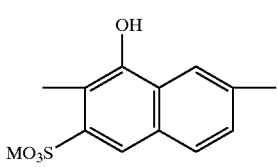

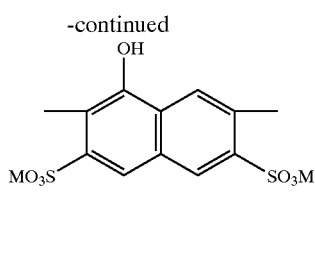
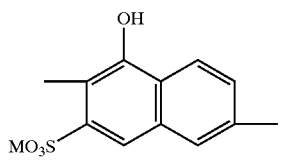
[Chemical Formula-3]
[Chemical Formula-11]
[Chemical Formula-33]
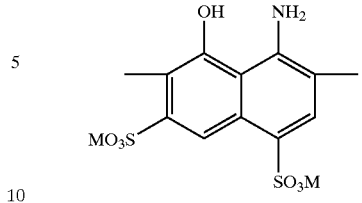
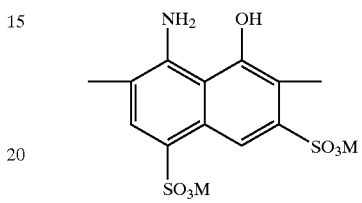
[Chemical Formula-4]
[Chemical Formula-12]
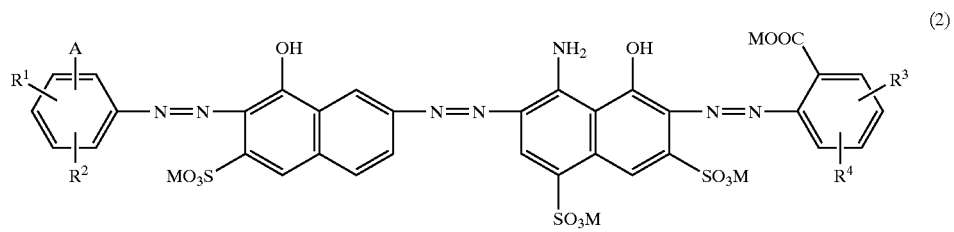
[Chemical Formula-5]
[Chemical Formula-13]
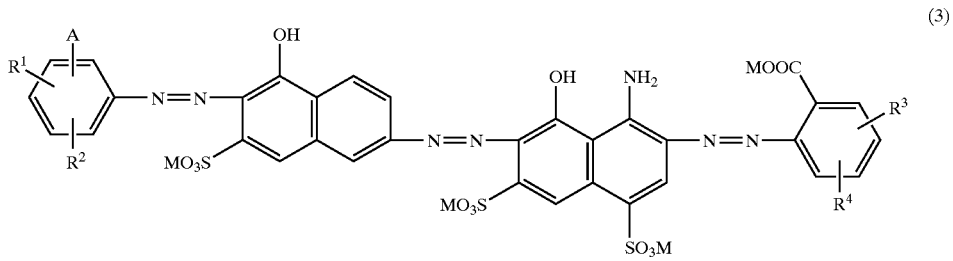

[Chemical Formula-7]
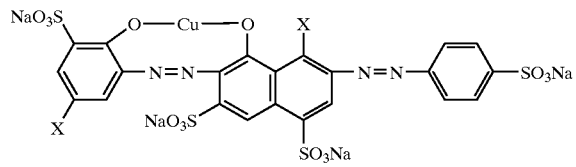
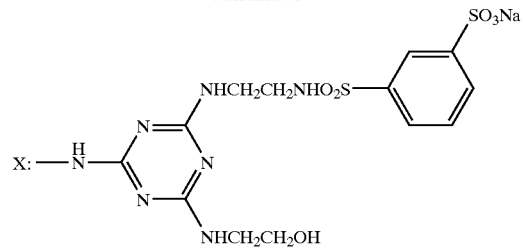
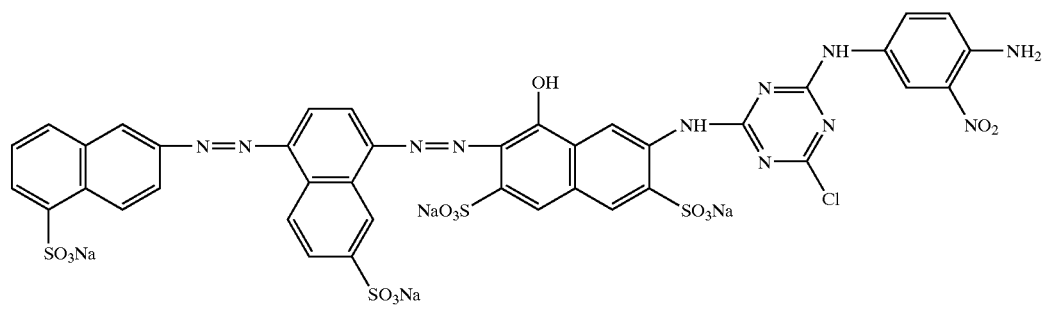
[Chemical Formula-6]
[Chemical Formula-14]
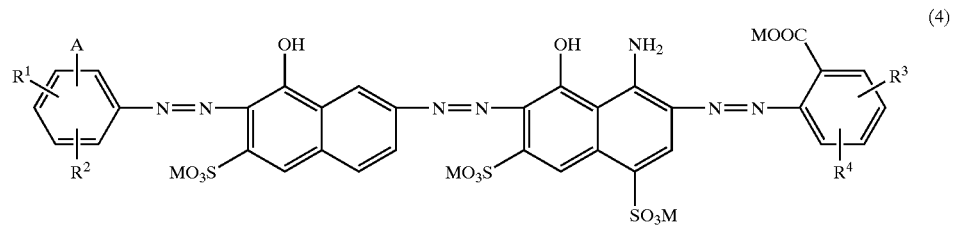
(4)
[Chemical Formula-15]
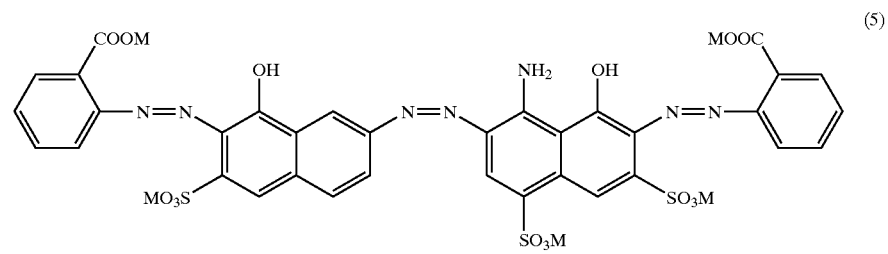
(5)

[Chemical Formula-16]
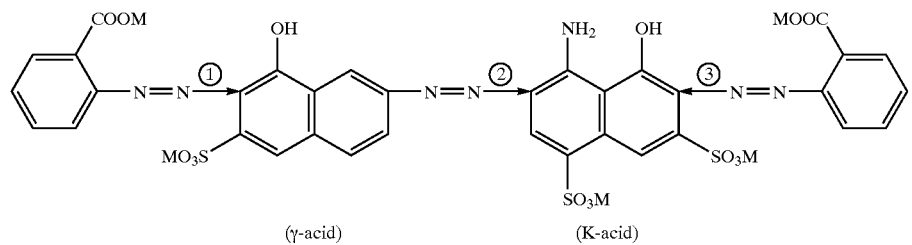
(γ-acid) (K-acid)
[Chemical Formula-17]
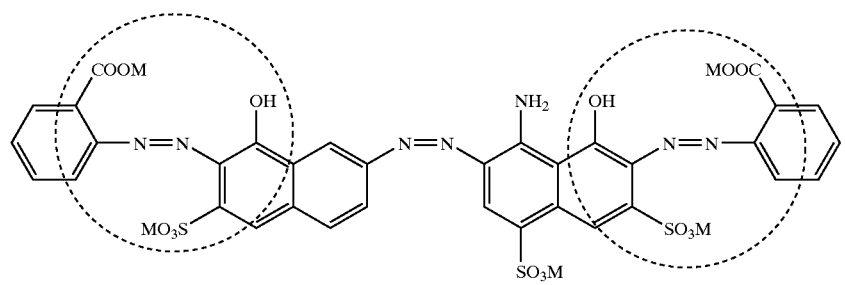
[Chemical Formula-18]
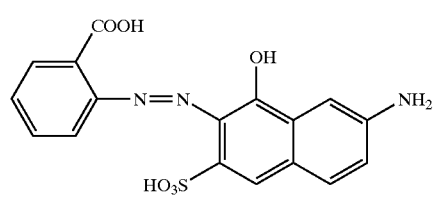
[Chemical Formula-19]
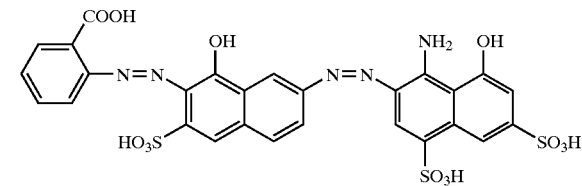
[Chemical Formula-20]
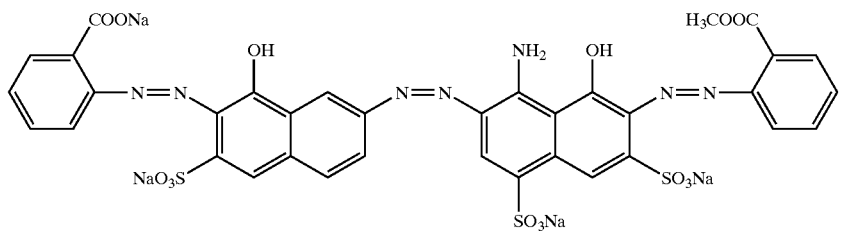

[Chemical Formula-21]
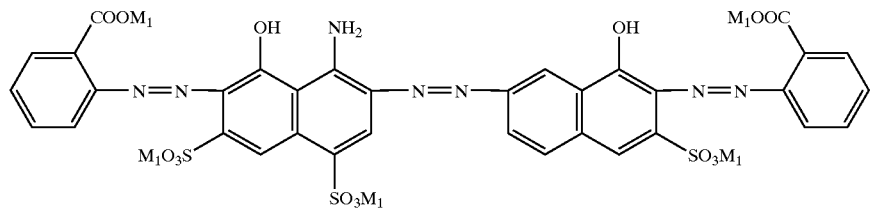
[Chemical Formula-22]
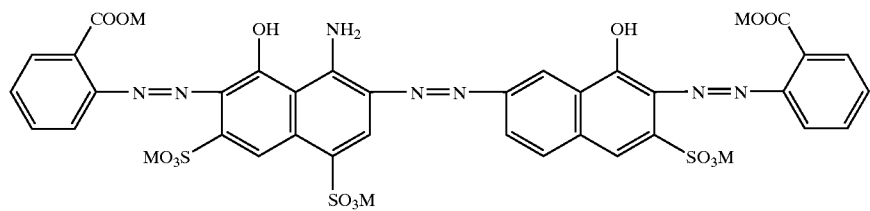
M = Na$^+$, NH$^+$(CH$_3$)$_2$(C$_2$H$_4$OH)
[Chemical Formula-23]
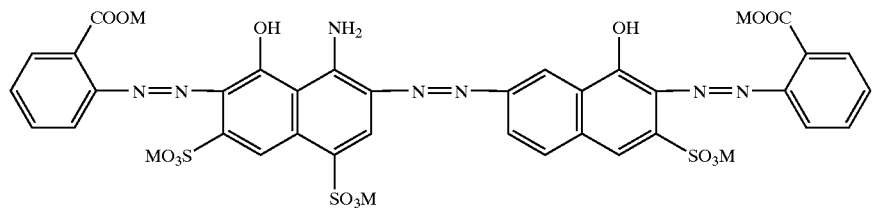
M = Na$^+$, NH$^+$(C$_2$H$_4$OH)$_3$
[Chemical Formula-24]
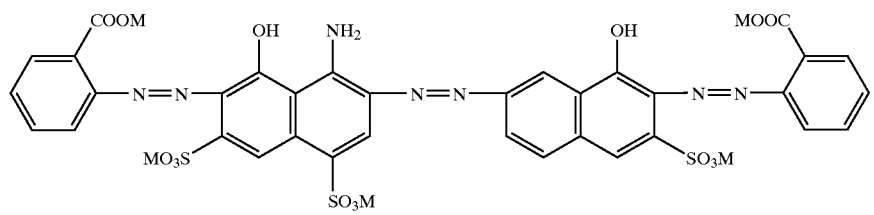
M = Na$^+$, NH$^+$[CH$_2$CH(CH$_3$)OH]$_3$

What is claimed is:

1. A black aqueous ink composition containing at least a trisazo dye represented by the following formula 1:

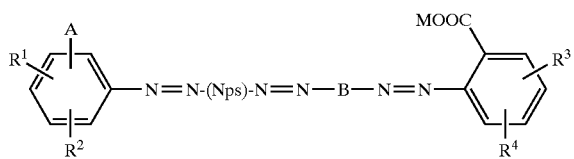

wherein A represents a hydrogen atom or a carboxyl group (—COOM); $R^1$, $R^2$, $R^3$, and $R^4$ each independently represents a hydrogen atom, an alkyl group having 1 to 5 carbon atoms, an alkoxy group having 1 to 5 carbon atoms, a hydroxyl group, a sulfamoyl group, a carbamoyl group, an acetyl group, a carboxyl group, a sulfo group, or a halogen atom; Nps is selected from the group consisting of:

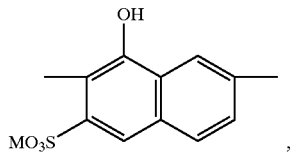

,

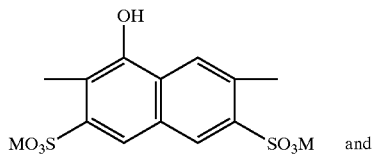

and

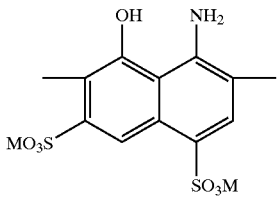

wherein M is selected from the group consisting of a hydrogen atom, an alkali metal, ammonium, and an organic ammonium; B is selected from the group consisting of:

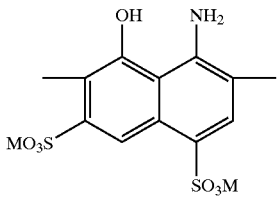

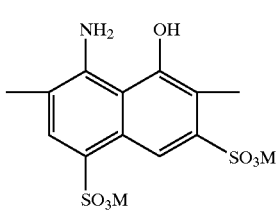

wherein M is selected from the group consisting of a hydrogen atom, an alkali metal, ammonium, and an organic ammonium.

2. The black aqueous ink composition of claim 1, wherein the trisazo dye is a trisazo dye represented by the following formula 2:

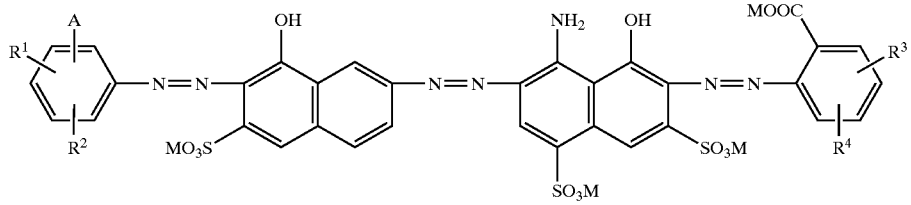

wherein A represents a hydrogen atom or a carboxyl group (—COOM); $R^1$, $R^2$, $R^3$, and $R^4$ each independently represents a hydrogen atom, an alkyl group having 1 to 5 carbon atoms, an alkoxy group having 1 to 5 carbon atoms, a hydroxyl group, a sulfamoyl group, a carbamoyl group, an acetyl group, a carboxyl group, a sulfo group, or a halogen atom; and M is selected from the group consisting of a hydrogen atom, an alkali metal, ammonium, and an organic ammonium.

3. The black aqueous ink composition of claim 1, wherein the trisazo dye is a trisazo dye represented by the following formula 3:

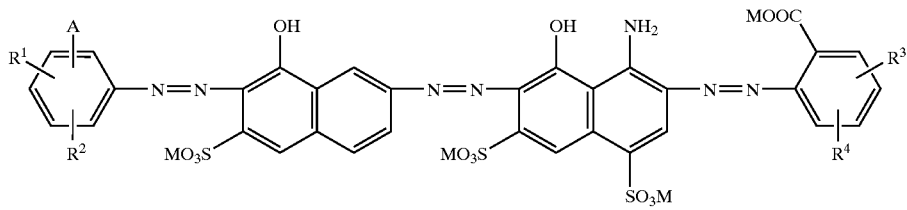

wherein A represents a hydrogen atom or a carboxyl group (—COOM); $R^1$, $R^2$, $R^3$, and $R^4$ each independently represents a hydrogen atom, an alkyl group having 1 to 5 carbon atoms, an alkoxy group having 1 to 5 carbon atoms, a hydroxyl group, a sulfamoyl group, a carbamoyl group, an acetyl group, a carboxyl group, a sulfo group, or a halogen atom; and M is selected from the group consisting of a hydrogen atom, an alkali metal, ammonium, and an organic ammonium.

4. The black aqueous ink composition of claim 1, wherein the trisazo dye is a trisazo dye represented by the following formula 4:

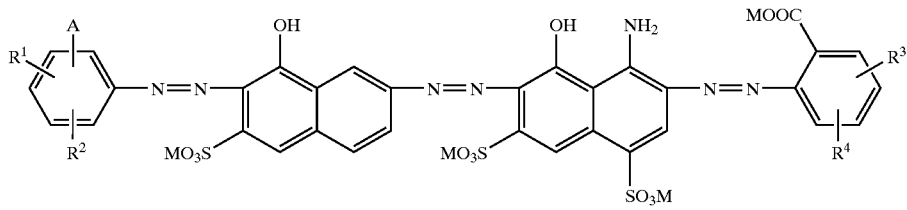

wherein A represents a hydrogen atom or a carboxyl group (—COOM); $R^1$, $R^2$, $R^3$, and $R^4$ each independently represents a hydrogen atom, an alkyl group having 1 to 5 carbon atoms, an alkoxy group having 1 to 5 carbon atoms, a hydroxyl group, a sulfamoyl group, a carbamoyl group, an acetyl group, a carboxyl group, a sulfo group, or a halogen atom; and M is selected from the group consisting of a hydrogen atom, an alkali metal, ammonium, and an organic ammonium.

5. The black aqueous ink composition of claim 1, wherein M in the trisazo dye represented by formula 1 is an organic ammonium.

6. The black aqueous ink composition of claim 5, wherein the organic ammonium is an organic ammonium derived from a tertiary amine.

7. The black aqueous ink composition of claim 6, wherein the tertiary amine is N,N-dimethylethanolamine, triethanolamine, or triisopropanolamine.

8. The black aqueous ink composition of claim 1, which contains the trisazo dye in an amount of from 0.1 to 12% by weight based on the whole amount of the ink composition.

9. The black aqueous ink composition of claim 1, which further contains a nitrogen-containing organic solvent.

10. The black aqueous ink composition of claim 9, wherein the nitrogen-containing organic solvent is 2-pyrrolidone.

11. The black aqueous ink composition of claim 1, which further contains a nonionic surfactant.

12. The black aqueous ink composition of claim 11, wherein the nonionic surfactant is an acetylene glycol type surfactant.

13. The black aqueous ink composition of claim 11, which contains the nonionic surfactant in an amount of from 0.1 to 5% by weight based on the whole amount of the ink composition.

14. The black aqueous ink composition of claim 1, which further contains a penetrating agent.

15. The black aqueous ink composition of claim 14, wherein the penetrating agent is a glycol ether.

16. The black aqueous ink composition of claim 1, which has a pH as measured at 20° C. of from 7.5 to 10.5.

17. The black aqueous ink composition of claim 1, which further contains a yellow dye as a complementary color.

18. The black aqueous ink composition of claim 17, wherein the yellow dye is C.I. Direct Yellow 86, 132, or 173.

19. An ink jet recording process comprising depositing ink droplets comprising the black aqueous ink composition of claim 2 onto a recording medium.

20. The ink jet recording process of claim 19, wherein the ink jet recording process is a recording process using an ink jet head which forms the ink droplets by means of mechanical deformations of an electrostrictive element.

21. An ink jet recording process which comprises ejecting droplets of an ink composition and adhering the droplets to a recording medium to conduct recording, wherein a black aqueous ink composition of claim 1 is used as the ink composition.

22. Recorded matter obtained through recording with a black aqueous ink composition of claim 1.

23. The black aqueous ink composition of claim 2, wherein M in the trisazo dye represented by formula 2 is an organic ammonium.

24. The black aqueous ink composition of claim 3, wherein M in the trisazo dye represented by formula 3 is an organic ammonium.

25. The black aqueous ink composition of claim 4, wherein M in the trisazo dye represented by formula 4 is an organic ammonium.

* * * * *